United States Patent
Nakaya et al.

[11] Patent Number: 5,913,266
[45] Date of Patent: Jun. 22, 1999

[54] PRINTING CYLINDER HAVING ANNULAR GROOVE

[75] Inventors: Yoshinori Nakaya; Takuji Tsugawa, both of Mihara, Japan

[73] Assignee: Mitsubishi Jukogyo Kabushiki Kaisha, Tokyo, Japan

[21] Appl. No.: 08/741,664

[22] Filed: Oct. 31, 1996

[30] Foreign Application Priority Data

Nov. 27, 1995 [JP] Japan ................................. 7-307276

[51] Int. Cl.⁶ .............................. B41F 13/08; F16C 13/00
[52] U.S. Cl. .................................. 101/375; 492/2; 492/6
[58] Field of Search .................................. 101/376, 375; 492/2, 6

[56] References Cited

U.S. PATENT DOCUMENTS

| | | | |
|---|---|---|---|
| 242,058 | 5/1881 | Schurmann | 492/6 |
| 2,048,005 | 7/1936 | Horton | 101/375 |
| 3,750,246 | 8/1973 | Pessen | 492/6 |
| 3,840,958 | 10/1974 | Mahn | 492/6 |
| 4,381,961 | 5/1983 | Van Der Velden | 101/375 |
| 4,602,408 | 7/1986 | Noe et al. | 492/2 |
| 4,813,258 | 3/1989 | Ginzburg | 492/2 |
| 4,895,070 | 1/1990 | Bird | 101/216 |
| 4,913,048 | 4/1990 | Tittgemeyer | 101/216 |
| 5,093,974 | 3/1992 | Ginzburg | 492/2 |
| 5,111,930 | 5/1992 | Ginzburg et al. | 492/2 |
| 5,216,953 | 6/1993 | Hada | 101/375 |

FOREIGN PATENT DOCUMENTS

| | | |
|---|---|---|
| 14 574 | 1/1881 | Germany . |
| 1963823 | 2/1965 | Germany . |
| 44 32 816 | 3/1996 | Germany . |
| 43 42 159 | 4/1997 | Germany . |

*Primary Examiner*—Edgar Burr
*Assistant Examiner*—Leslie Grohusky
*Attorney, Agent, or Firm*—Wenderoth, Lind, & Ponack L.L.P.

[57] ABSTRACT

A printing cylinder 20 has a length for mass printing and is used for an inking roller group for supplying printing ink, a plate cylinder having a printing plate, a blanket cylinder for printing with the ink transferred from the printing plate, etc. A ring groove 25 is dug at each end face of the printing cylinder 20 so as to open annularly and to have a depth of ¼ to ⅓ of the length of the printing cylinder 20 in the axial direction of the printing cylinder. Deflection deformation caused on the outer circumference of the printing cylinder 20 can thereby be equalized at the central portion and both end portions of the printing cylinder 20. Axial directional changes in the pressing force caused by the deflection deformation can be reduced, and even with the elongated printing cylinder 20 of the same cylinder diameter as a conventional one, irregularities of inking in the axial direction of the printing cylinder 20 due to changes in the pressing force do not occur. Thus a high quality printing is maintained.

2 Claims, 7 Drawing Sheets

PRINTING CYLINDER HAVING ANNULAR GROOVE

BACKGROUND OF THE INVENTION

1. Field of the Invention

The present invention relates to a printing cylinder, such as a blanket cylinder (roller), a plate cylinder (roller), a feed roller for transferring ink from an ink reservoir onto a plate cylinder, etc., used for various printing machines such as an offset rotary press, etc.

2. Description of the Prior Art

Figure 12:
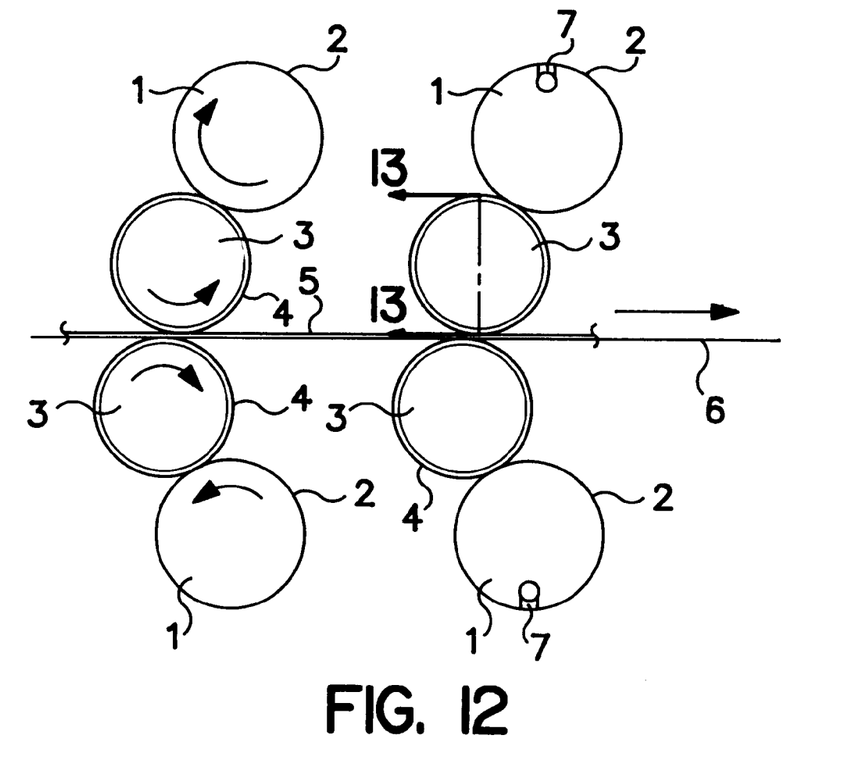
FIG. 12 is an explanatory view showing an example of an arrangement of printing cylinders as a part of a printing machine.

A printing machine in the prior art is constructed so that printing ink, supplied in an ink reservoir, is transferred from one roller to another in an inking roller group (not shown in a figure), consisting of many rollers like feed rollers etc., in which adjacent rollers make rolling contact with each other via their outer circumferential surfaces. The ink is distributed appropriately during the transfer process to form a thin ink film, and then, as shown in FIG. 12, it is transferred on a printing plate 2, which forms a printing face and is wound around a plate cylinder 1. The ink is further transferred from the printing plate 2 to a blanket 4 fitted around the outer circumferential surface of a blanket cylinder 3. Then printing is performed on each side of a running web 5 with the blanket 4 while the respective blanket cylinder 3, disposed above and below, makes rolling contact with the running web 5 via its outer circumferential surface.

If ink is supplied to, and transferred by, only one of the blankets 4 of the blanket cylinders 3 disposed above and below a sheet path line 6 along which the web 5 runs, printing on one side only of the web 5 can be performed. If plural sets, usually 4 sets, of the blanket cylinders 3 are arrayed in parallel along the running direction of the web 5, multi-colored printing can be performed.

As the printing plate 2 used for printing by the printing machine is required to be changed each time according to what is to be printed on the web 5, a slit groove 7 is formed on the outer circumferential surface of the plate cylinder 1 along its entire axial directional length, so that the printing plate 2, on which a rectangular printing surface is formed, is wound around the plate cylinder 1 with the front and rear ends of the printing plate 2 inserted and gripped (fixed) in the slit groove 7.

As to the blanket 4 fitted to the blanket cylinder 3, in printing machines, before being improved to the printing machine shown in FIG. 12, like the printing plate mentioned above, a slit groove was formed on the outer circumferential surface of the blanket cylinder 3, and the front and rear ends of the blanket 4 were inserted therein so that the blanket was fitted to the blanket cylinder 3.

Figure 13:
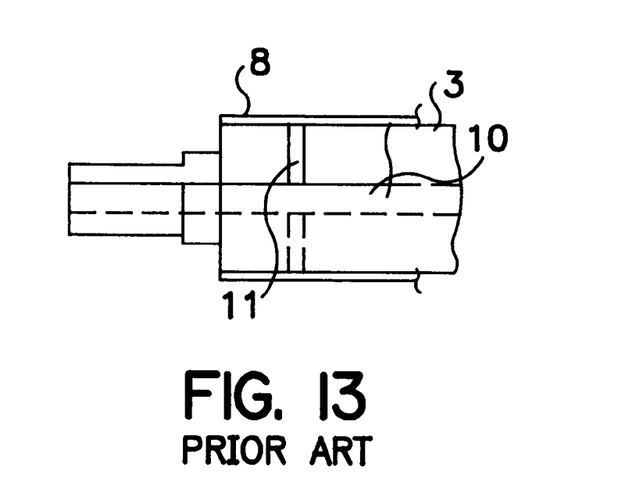
FIG. 13 is a partial longitudinal sectional view of one end portion of a blanket cylinder in the prior art.

In a modern commercial offset rotary press, however, a printing machine using a cylindrical blanket 8 as the blanket 4, as shown in FIG. 12 and in FIG. 13, which is a detailed sectional view of the blanket cylinder 3 seen from arrows 13—13 of FIG. 12, has been put to practical use.

Figure 14:
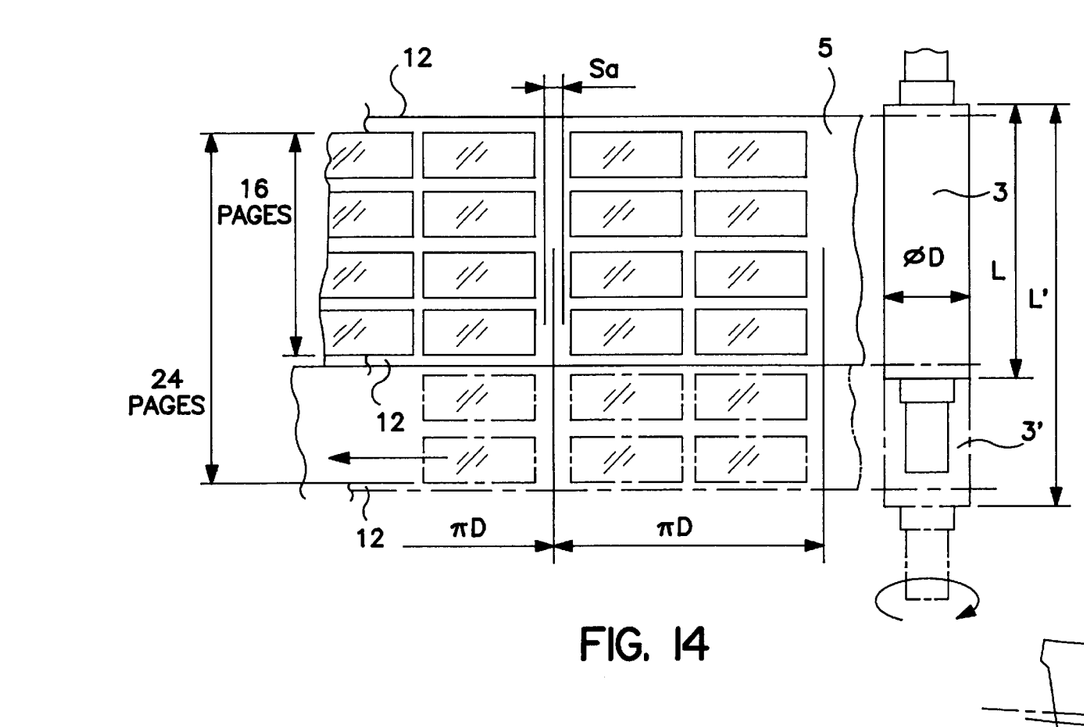
FIG. 14 is a plan view of a web and a printing cylinder for explaining an example of a customer requirement tendency in a printing machine.

By use of such a cylindrical blanket 8, length Sa of a nonprinted portion in the running direction of the web 5 shown in FIG. 14 can be greatly reduced. Thereby loss of paper can be reduced and the cost of printing paper can be saved.

In a printing machine as shown in FIG. 13, the cylindrical blanket 8 is formed in a sleeve shape so as to be attached to and detached from the outer circumferential surface of the blanket cylinder 3. One of the bearing portions supporting both ends of the blanket cylinder 3 can be taken out so as to form a space so that attachment and detachment of the cylindrical blanket 8 is facilitated.

In the blanket cylinder 3, a through hole 10 is provided through the central axis portion of the blanket cylinder 3 so as to open at each end of the shaft, and an air blowing hole 11 is provided in the radial direction of the blanket cylinder 3 so as to pass from the through hole 10 to the outer circumferential surface. Compressed air introduced from the outside via the through hole 10 passes through the through hole 10 and the air blowing hole 11 to be injected outside in the radial direction of the blanket cylinder 3. A compressed air film is thereby formed in a gap formed between the outer circumferential surface of the blanket cylinder 3 and the inner circumferential surface of the cylindrical blanket 8, and thus attachment and detachment of the blanket 8 is further facilitated.

In the blanket cylinder 3, during normal printing operation, the supply of compressed air to the gap is stopped and the blanket 8 keeps close contact with the blanket cylinder 3 without slippage.

A slit groove for fitting the blanket, which was necessary to be formed on the outer circumferential surface of the blanket cylinder 3, similar to the slit groove 7 provided at the plate cylinder 1 shown in FIG. 12, thereby becomes unnecessary.

By the blanket 4 being wound around the blanket cylinder 3 being improved to the cylindrical blanket 8 attachable to and detachable from the blanket cylinder 3 as well as by the slit groove 7, or the gap width, of the plate cylinder 1 being made smaller, changes in the pressing force caused by shocks of the meshing of gaps or other various shocks have been greatly mitigated.

These shocks mainly involve those shocks generated as motion (vibration) in the radial direction of the plate cylinder 1 and the blanket cylinder 3 and those shocks generated as changes in angular velocity (rotation irregularity) in the rotational direction. Generation of these shocks will be a cause of duplication, slur, shock mark, gear mark, etc., that is, various printing obstacles, such as inking irregularities, color slippage, periodically generated belt-like printing irregularities, etc. on the printed surface.

But, by the improvement in using the cylindrical blanket 8, shocks accompanying the rolling contact of the plate cylinder 1 and the blanket cylinder 3 have been greatly reduced, and a printing machine which is capable of high quality printing and high speed operation has been realized.

Further, in relation to this improvement, as well as the improvement of making the width of the slit groove 7 smaller, or of making the slit groove unnecessary, it has become possible to make the rigidity of the plate cylinder 1, the blanket cylinder 3, etc. smaller.

Accordingly, without the necessity of using stronger rollers, there is an advantage in that, not only a compact size of the driving means, but also a compact size and reduced weight of the entire printing machine become possible.

As mentioned above, presently recent printing machines have made remarkable technical progresses.

In printing machines as shown in FIG. 12 as so improved, however, there is a customer need for further improvement in the reduction of the loss of paper and enhancement of production efficiency by way of enlarging the machine width, that is, enlarging the width of the web 5 to be printed.

That is, in FIG. 14, while the printing of 16 pages has been performed on both sides of the web 5 in the prior art, as shown by solid lines, by one rotation of the blanket cylinders 3, disposed above and below as in FIG. 12, a multi-page printing by one rotation of a blanket cylinder 31 is sought so that, by the machine width being enlarged, the printing of 24 pages on both sides of web, as shown by one-dot and dash lines, can be performed.

By such an improvement, the following effects are being expected:

(1) A paper loss portion 12 at each widthwise marginal end of the web 5 is reduced in amount in relative ratio to the entire width. That is, the paper loss portion 12 caused at the printing of every 16 pages is now caused at the printing of every 24 pages, so that the ratio of paper loss portion 12 is reduced.

(2) A folded binder becomes multi-page, and a bookbinding line can be made intensive.

(3) Further enhancement of productivity can be attained.

For realizing these requirements, however, it is necessary to elongate the length in the axial direction, from L to L', of the printing cylinder 20 used for printing, including the blanket cylinder 3 and the plate cylinder 1. The elongation of the printing cylinder 20 involves a large problem of deflection deformation of the printing cylinder 20 at the time of printing. That is, in addition to vibration occurring at the rotating shaft of the printing cylinder 20, there is caused a large problem of non-uniformity of the pressing force, represented by a nip pressure, between the central portion and both end portions of the printing cylinder 20.

Figure 15:
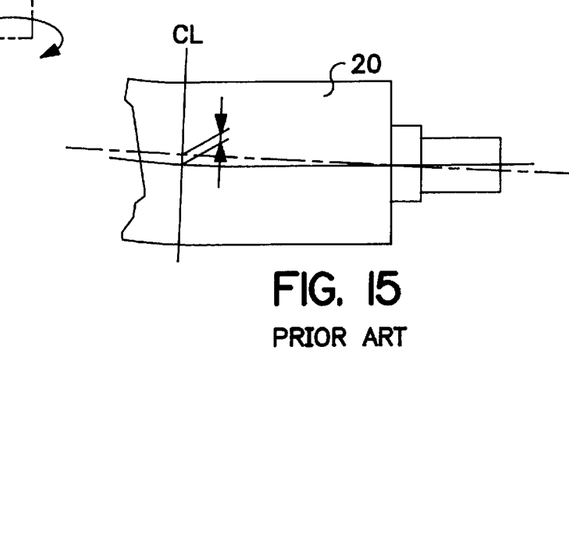
FIG. 15 is a partial schematic view explaining a deflection tendency of a printing cylinder caused by a printing force acting on a printing cylinder in the prior art.

The deflection deformation of the printing cylinder 20 occurs in a form as shown in FIG. 15. But if, for example, the cylinder diameter is to be enlarged for enhancement of deflection strength as a countermeasure for resolving the non-uniformity of the pressing force, there occur other problems relating to the size increase of the cylinder diameter and ancillary equipment, like bearings, etc., and the capacity increase of a motor as a driving means, as well as the size increase of the entire printing machine.

SUMMARY OF THE INVENTION

In addition to a printing machine in the prior art as shown in FIG. 12, in which a certain improvement has been made for enabling a high quality printing and a high speed operation with a compact size and weight alleviation for an entire printing machine, it is an object of the present invention to provide a further means for satisfying recent customer requirements, that is, to provide a printing cylinder which is elongated in its axial directional length, with the present diameter of the cylinder being unchanged, so as not to cause a size increase of ancillary equipment like bearings, etc., or a capacity increase of a drive unit, which will cause a size increase of the entire printing machine, thereby achieving an increase of the number of pages printed by one rotation of the blanket cylinder, a reduction of the ratio of area of a non-printed portion (paper loss portion) at each widthwise marginal portion of web, enhancement of production efficiency, realization of intensive bookbinding line and reduction of influence of deflection deformation on a printed matter caused by said elongation of the axial directional length of the printing cylinder.

In order to achieve the above object, the present invention employs the following construction. A printing cylinder used for an inking roller group, such as a feed roller etc., a plate cylinder and a blanket cylinder, composing a printing machine, has a ring groove formed therein so as to open at each side end face of the printing cylinder in a circumferential continuous ring shape which is concentric with the printing cylinder and so as to have a groove bottom portion of a predetermined depth in the cylinder axis direction.

The depth of the groove bottom portion of the ring groove provided in the axial direction, or length of the ring groove in the axial direction, is, although varied according to design conditions of the printing cylinder, practical if it is set to approximately ¼ to ⅓ of the entire length of the printing cylinder. Each groove bottom portion is preferably arranged symmetrically in the axial direction relative to the central portion of the printing cylinder. The ring groove is practical if it is provided at a radial directional position such that a thickness of the outer circumferential portion of the printing cylinder is formed in approximately 5 to 10% of the outer diameter of the printing cylinder.

Thereby, in the printing cylinder according to the present invention, deflection deformation at the printing cylinder central portion and both side end portions caused by the pressing force added to the printing cylinder at the time of printing and the reaction force acting on the bearing portions are generated so as to cancel each other and to be balanced. Accordingly, irregular changes in the axial directional pressing force caused by deflection of the printing cylinder at the printing cylinder central portion and both end portions can be reduced.

Therefore, in a printing cylinder of the same diameter, which can be driven by the same ancillary equipment and drive unit as present ones, the axial directional length of the printing cylinder is elongated so that the width of the printing cylinder used for printing is enlarged. Thus the number of pages printed by one rotation of the blanket cylinder is increased, the area ratio of the non-printed portion (paper loss portion) generated at each widthwise marginal end of web can be reduced, and efficient production and intensive bookbinding line can be realized.

Despite elongation of the axial directional length of the printing cylinder, the influence of deflection deformation on printing can be mitigated and the generation of printing failures in the printed matter can be prevented, and thus a printing of high quality is obtained.

Further, in the printing cylinder according to the present invention, the deepest portion, or the groove bottom portion, of the ring groove dug concentrically in the axial direction of the printing cylinder is made in a spherical form having no edge (sharp angle) portion so as to mitigate stress concentration.

The spherical form may be one that is rounded of the distal end of the ring groove or that is provided with a spherical portion in the space around the distal end which is larger than the width of the ring groove or any other form that can prevent cracks, fractures, etc. due to metal fatigue etc. with accompanying stress concentration on the deepest portion of the ring groove. Thereby, in the printing cylinder according to the present invention, when printing, that is, when a pressing force is being added to the printing cylinder, the stress concentration on the deepest portion of the ring portion can be mitigated and cracks or fractures starting from the groove bottom portion of the ring groove due to repeated loading on the printing cylinder can be prevented. Hence a long life and enhancement of durability of a printing cylinder capable of printing with high accuracy can be realized.

Further, in the printing cylinder according to the present invention, an elastic material is filled in the gap (space) within the ring groove that is dug concentrically in the printing cylinder axial direction.

As for the elastic material, an elastic material of rubber etc. which is able to mitigate rapid deflection deformation occurring concentrically with the printing cylinder so as to make shocks smaller is most appropriate.

Thereby, in the printing cylinder according to the present invention, deflection deformation of the printing cylinder when printing and when a pressing force acts on the printing cylinder can be reduced, and especially radial directional motion (vibration) of the printing cylinder can be dampened. Fractures of the printing cylinder due to repeated loading can be prevented, and a long life of a printing cylinder capable of printing with high accuracy can be realized.

Further, in the printing cylinder according to the present invention, the printing cylinder is a blanket cylinder of a type in which a sleeve-like outer cylinder, such as a cylindrical blanket etc., is attached to or detached from the cylinder outer circumferential surface. There are provided an air blowing hole passing through in the radial direction across the ring groove so as to open at the printing cylinder outer circumferential surface and a sealing device for sealing the opening of the ring groove on each side end face of the printing cylinder.

Thereby, in the printing cylinder according to the present invention, the blowing performance of compressed air supplied into the gap between the blanket inner circumferential surface and the blanket cylinder outer circumferential surface when attaching or detaching the sleeve-like blanket to and from the cylinder outer circumferential surface can be maintained without leakage of the compressed air from the opening of each end face of the printing cylinder through the ring groove, despite the ring groove being provided for prevention of deflection with accompanying elongation of the printing cylinder. Thus, by the blanket inner circumferential side being provided with pressure, the blanket can be expanded in the same way as a blanket cylinder having no ring groove, and the attachment and detachment of the blanket to and from the cylinder outer circumferential surface can be easily done.

As mentioned above, in the printing cylinder according to the present invention, the following effects or advantages can be obtained. By a groove being formed in a ring shape with a predetermined depth at each side in the axial direction of the printing cylinder, as deflection of the central portion, and that of both side end portions of the printing cylinder, caused by the contact pressure between mutually engaged printing cylinders, act in opposite directions to each other, the difference in the deflection deformation occurring in the widthwise direction of the printing cylinder can be greatly reduced. A uniform pressing force in the widthwise direction can be obtained, and the entire length of the printing cylinder can be elongated, even if the (4) as the deflection deformation is reduced, in a printing printing cylinder is of same diameter as that in the prior art. Thus:

(1) the number of pages which can be printed by one rotation of the plate cylinder can be increased, (2) the web width being enlarged, the paper loss portion at the paper widthwise end portions can be reduced per area of paper, (3) a folded binder becoming multi-page, an intensive bookbinding line can be realized downstream, cylnder of same axial directional length, bearings can be disposed further out, and machining, assembly and maintenance are facilitated, (5) enhancement of the printing quality and enhancement of productivity by high speed operation can be realized, and (6) the printing cylinder can be used for a wide range of applications, including guide rollers, feed rollers forming an inking roller group and other various rollers not limited to printing cylinders.

Further, the deepest portion of the ring groove that is dug concentrically in the axial direction is formed in a spherical shape having no edge (sharp angle) portion for the purpose of mitigating stress concentrations there, and an elastic material is filled in the gap (space) within the ring groove. Thus:

(7) stress concentrations caused by formation of the ring groove in the printing cylinder can be absorbed and mitigated, and radial directional vibration can be reduced. Hence an enhancement of the printing quality in various aspects is attained and the durability of the cylinder (accuracy maintenance) is increased.

Further, the printing cylinder is used for a blanket cylinder of a type in which a sleeve-like outer cylinder is attached to or detached from the cylinder outer circumferential surface. There are provided an air blowing hole passing through in the cylinder radial direction across the ring groove so as to open at the printing cylinder outer circumferential surface and a sealing device for sealing the opening of the ring groove on each end face of the printing cylinder. Thus:

(8) air being sealed, the blowing function of compressed air for forming an air film at the time of attachment or detachment of the cylindrical blanket can be maintained and secured, attachment and detachment of the blanket is facilitated and, during a normal printing operation, the blanket keeps close contact with the blanket cylinder so that no slippage occurs.

BRIEF DESCRIPTION OF THE DRAWINGS

In the accompanying drawings:

FIG. 1(a) and 1(b) are views showing a printing cylinder of a first preferred embodiment according to the present invention, wherein FIG. 1(a) is a side view, partially in longitudinal section, and FIG. 1(b) is a view seen from arrows A—A of FIG. 1(a);

FIGS. 9(a) and (b) are partial longitudinal sectional views of end portions, showing a manufacturing process of the printing cylinder of FIG. 1, wherein FIG. 9(a) is of a first example and FIG. 9(b) is of a second example;

FIG. 10(a) and (b) are partial longitudinal sectional views of end portions, showing a manufacturing process of the printing cylinder of FIG. 1, wherein FIG. 10(a) is of a third example and FIG. 10(b) is of a fourth example;

DESCRIPTION OF THE PREFERRED EMBODIMENTS

Figure 1A:
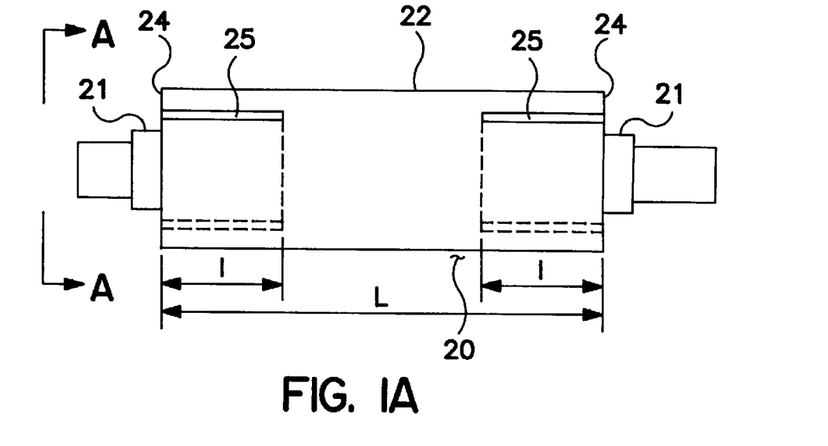
Figure 1B:
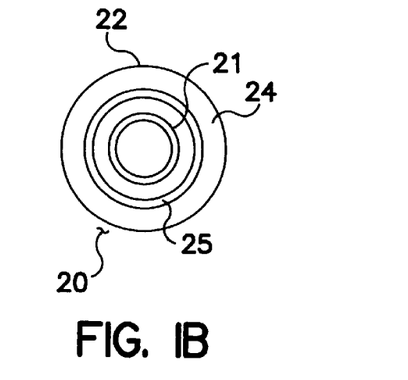

As shown in FIGS. 1(a) and (b), in a printing cylinder 20 of a first preferred embodiment according to the present invention, a circumferentially continuous ring shaped opening is provided at each end portion of a cylinder body 2 having a length of L. A ring groove 25 is formed so as to have a groove bottom portion at a predetermined depth of l from each opening in the axial direction.

By the ring groove 25 being formed in the cylinder body 22, on which a pressing force acts, of the printing cylinder 20, the following effects are obtained.

Figure 2:
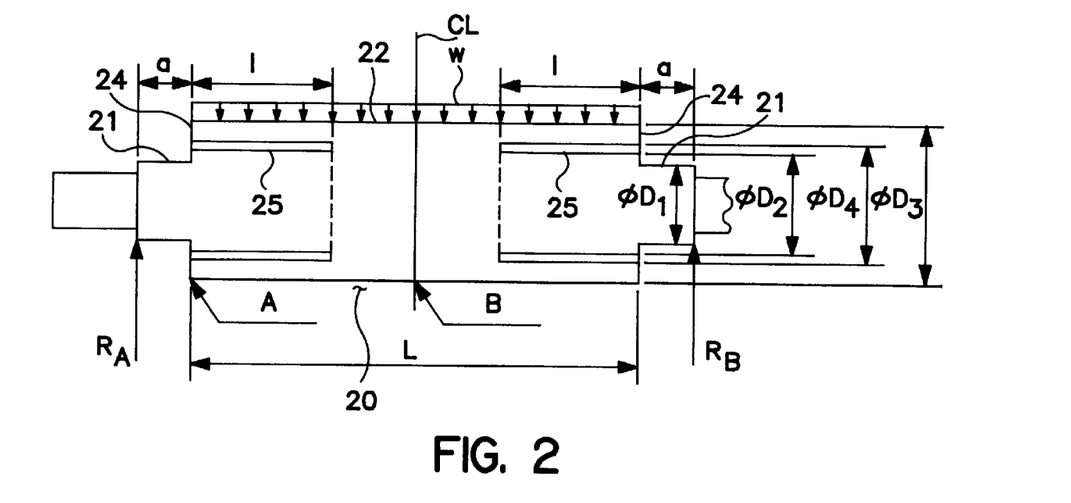
FIG. 2 is a longitudinal sectional view of the printing cylinder of FIG. 1, showing a state of loading on the printing cylinder.

That is, as shown in FIG. 2, where the length of the cylinder body 22 is L, the length of one end of a shaft 21 is a, the depth of the ring groove 25 from one end face 24 of the cylinder body 22 in the axial direction is l, a uniform distribution load acting on the cylinder body 22 is w and a fulcrum reaction force acting on one end portion of the shaft 21 is $R_A$ (with $R_B$ being the fulcrum reaction force on the other end portion), then the moment $M_X$ acting for bending (deflection) is as shown in general formulae (1) to (3) below:

$$\text{Moment by } w: M_{xw} = -w \cdot \frac{(L/2 - x)^2}{2} \qquad (1)$$

Moment by $R_A$: $M_x R_A = w \cdot L/2 \cdot (L/2 - x + a)$ (2)

Composite moment: $M_x = M_{xw} + M_x R_A = w/8 \cdot (L^2 - 4x^2 + 4aL)$ (3)

provided that x, being less than L/2 and larger than 0, is on the coordinates in the axial direction of the printing cylinder 20 wherein the origin is the center line CL (point B) of the cylinder body 22.

In the above formula (3), as x is less than L/2, ($L^2 - 4x^2$) is always a positive value and the composite moment $M_x$ becomes positive everywhere.

But, if l is given a predetermined length, that is, at the portion of an outer cylinder of the cylinder body 22 where the ring groove 25 is provided, there is generated a moment by w, but there is generated no moment by fulcrum reaction force $R_A$. And, at the shaft 21, there is generated a moment by RA but there is no moment by uniform distribution load w.

From the above, it is understood that the ring groove 25 has an effect of mitigating the influence on the moment $M_x$ by the fulcrum reaction force $R_A$ generated at the portion of the cylinder body 22 where the ring groove 25 is dug.

Figure 3:
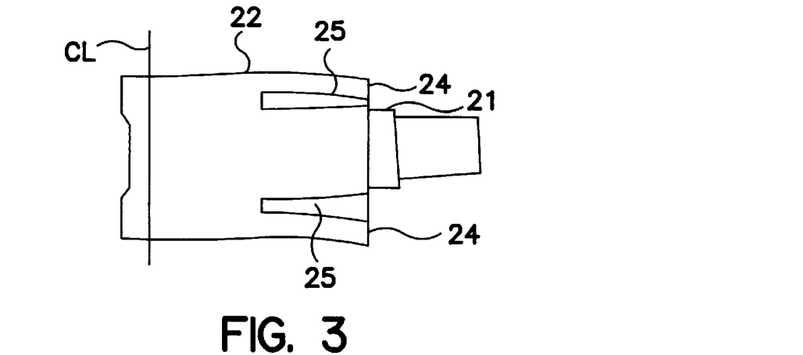
FIG. 3 is a partial schematic view showing axial directional deflection deformation of the printing cylinder of FIG. 1.

Incidentally, the printing cylinder 20 makes deflection deformation, as shown in FIG. 3, caused by the moment $M_{XW}$ and $M_X R_A$ of the formulae (1) and (2).

Next, taking an example of a usual printing cylinder 20, a model calculation example is shown below as to deflection deformation at point A of the end face of the cylinder body 22 and point B of the center line CL of the cylinder body 22, shown in FIG. 2.

Figure 4:
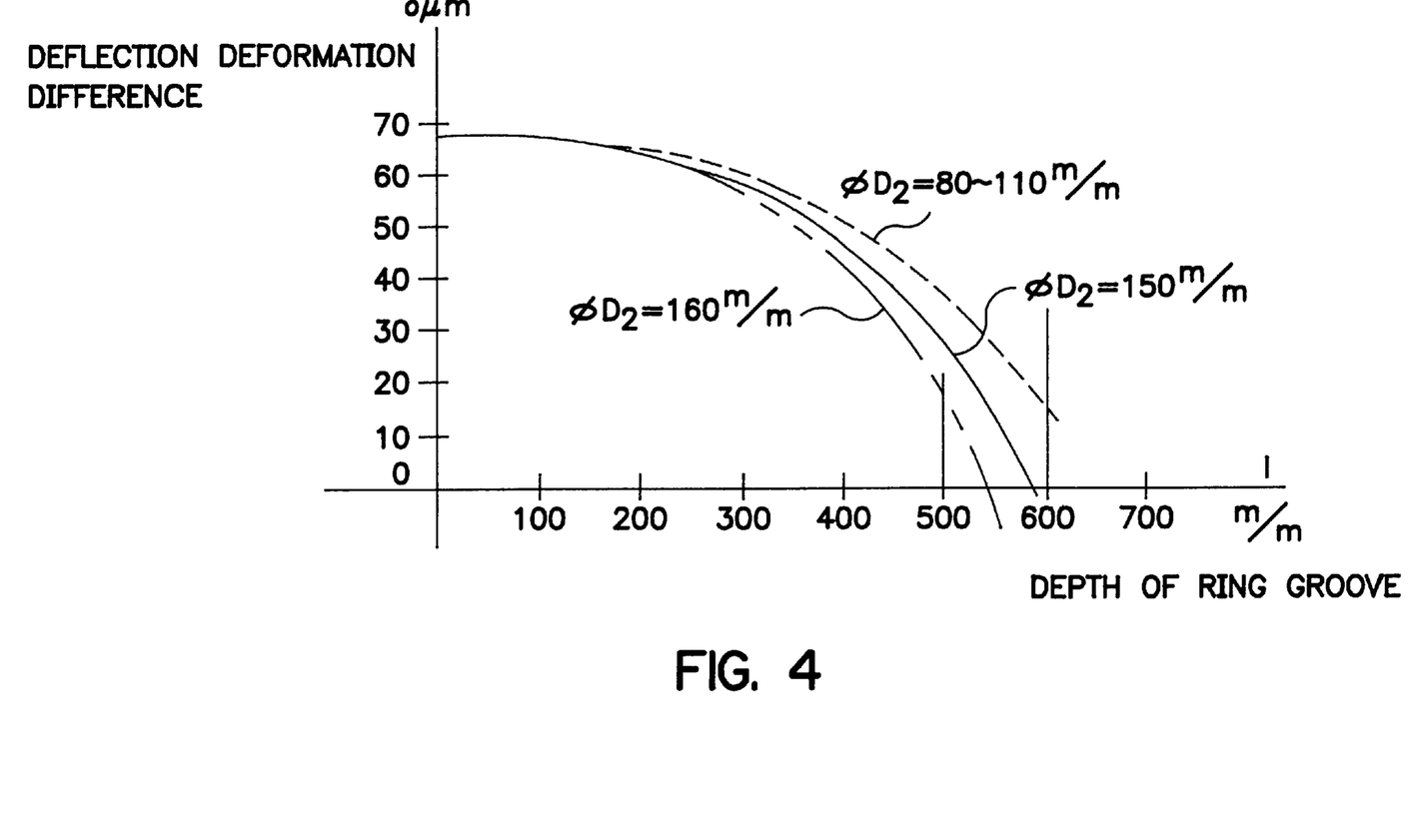
FIG. 4 is a graph showing a relation between the depth of a ring groove provided in the printing cylinder of FIG. 1 and the deflection difference between the printing cylinder central portion and both end portions of the printing cylinder, with the inner diameter of the ring groove being a parameter.

If a calculation is made on: L=1500 mm, w=0.67 kg/mm, a=1000 mm, $\phi D_1$=80 mm, $\phi D_3$=170 mm, $\phi D_2 = \phi D_4$=80–110 mm, 150 mm and 160 mm, the difference δ of deflection deformation between the points A and B is as shown in FIG. 4. As mentioned above, the deflection deformation difference δ as shown in FIG. 4 is calculated providing $\phi D_2$ equals $\phi D_4$.

That is, based on the shape and loading condition of the printing cylinder 20, if the inner diameter $\phi D_2$ and outer diameter $\phi D_4$ of the ring groove 25 are $\phi D_2 = \phi D_4$=150–160 mm, and the depth l of the ring groove 25 is l=500–600 mm, the deflection amount at point A of the end portion of the cylinder body 22 and that at point B of the center portion of the cylinder body 22 become approximately equal to each other, and there exists a point where the difference δ of the deflection deformation becomes 0.

That is, if the ring groove 25 is dug at a depth l of approximately ¼ to ⅓ of the length L of the cylinder body 22, it is found that the deflection amount at point A of the end portion of the cylinder body 22 and at point B of the center portion of the cylinder body 22, respectively, becomes approximately equal and that the pressing force in the axial direction of the cylinder body 22 becomes approximately equal, and thus a practical effect can be expected.

Further, the thickness of the outer cylinder portion of the cylinder body 22 where the ring groove 25 is provided may be decided by taking into account the deflection amount of the outer cylinder and the rigidity of the shaft portion of the cylinder body 22 of the inner circumferential side of the ring groove 25, which is practical if it is set to approximately 5 to 10% of the outer diameter ($\phi D_3$) of the cylinder body 22.

Figure 5:
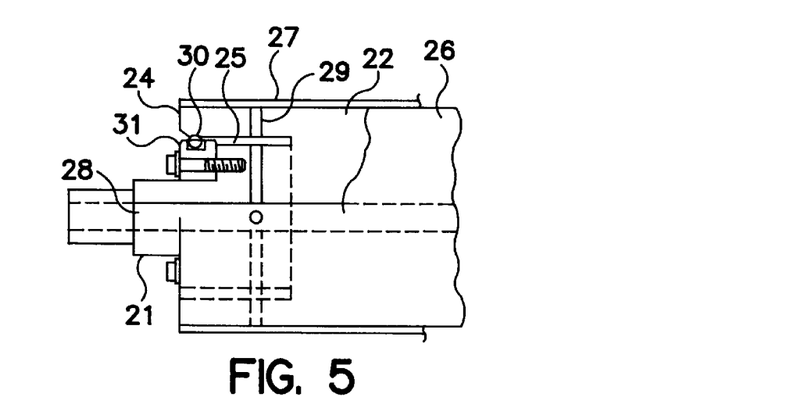
FIG. 5 is a partial longitudinal sectional view of one end portion of a printing cylinder of a second preferred embodiment according to the present invention.

Next, in a blanket cylinder 26 of a second preferred embodiment according to the present invention as shown in FIG. 5, likewise as described for FIG. 13 as prior art, in order to assist attachment and detachment of a cylindrical blanket 27 to and from the outer circumferential surface of the blanket cylinder 26, a through hole 28 is provided through the central axis portion of the blanket cylinder 26. An air blowing hole 29 connecting from the through hole 28 to the outer circumferential surface of the blanket cylinder 26 is dug in the radial direction at a place near each shaft end portion of the blanket cylinder 26.

In this case, however, if a ring groove 25 as described in the first preferred embodiment of FIG. 1 is dug in the blanket cylinder 26 as shown in FIG. 5, the air blowing hole 29 passes through in the radial direction across the ring groove 25. Compressed air to be injected into a gap between the blanket cylinder 26 and the cylindrical blanket 27 at the time of attachment and detachment of the blanket 27 will leak out from the opening of the ring groove 25 at each end face 24 of the blanket cylinder 26. The function of forming an air film in the gap between the inner circumferential surface of the blanket 27 and the outer circumferential surface of the blanket cylinder 26 will thus be lost.

In this preferred embodiment, therefore, at the opening portion of the ring groove 25 of each end face of the blanket cylinder 26, an O-ring 30 is fitted via an O-ring holder 31 so that the opening portion to open at the end face 24 of the cylinder body is sealed.

Incidentally, in place of the 0-ring 30, other sealing members, like a seat packing, etc., can be used insofar as the function and effect mentioned for the first preferred embodiment is obtained by the ring groove 25 being provided, and insofar as the flow-out of compressed air from opening of the ring groove 25 at the time of attachment and detachment of the cylindrical blanket 27 can be prevented.

According to the blanket cylinder 26 of this preferred embodiment as so constructed, the ring groove 25 functions as described for the first preferred embodiment. Leakage of compressed air supplied from the through hole 28 of the central axis portion can be prevented, and thus the same advantage of using a cylindrical blanket 27 as that described for the blanket cylinder 3 in the prior art of FIG. 13, i.e. attachment and detachment of the cylindrical blanket 27 can be made smooth, can be enjoyed. A printing machine which is capable of high quality printing and a high speed operation can thus be obtained.

Figure 6:
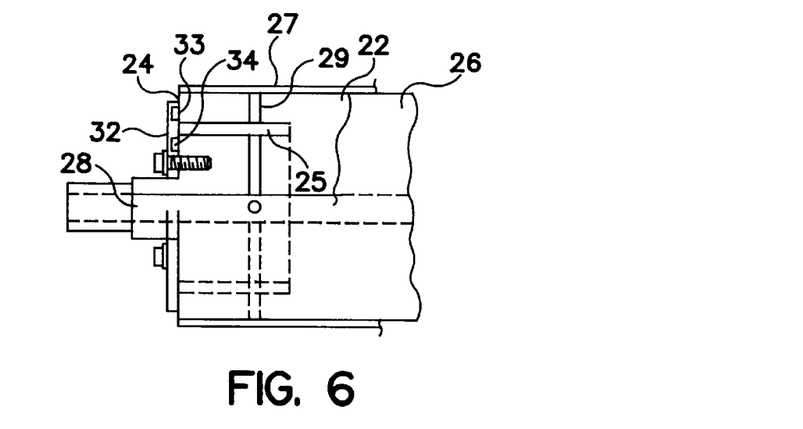
FIG. 6 is a partial longitudinal sectional view of one end portion of a printing cylinder of a third preferred embodiment according to the present invention.

Next, in a third preferred embodiment according to the present invention shown in FIG. 6, likewise as in the second preferred embodiment shown in FIG. 5, the present invention is applied to a blanket cylinder 26 in which a cylindrical blanket 27 is attached to or detached from the outer circumferential surface.

In this preferred embodiment, at the opening portion of the ring groove 25 on each end face 24 of the blanket cylinder 26, two rings 33 and 34 are fitted via a flange 32 so as to prevent leakage of compressed air, which is a different point from the second preferred embodiment.

According to this preferred embodiment, in addition to the same function and effect as the second preferred embodiment being obtained, there is a further function and effect in that sealing of the opening portion of the ring groove 25 can be made more secure, and attachment and detachment of the cylindrical blanket 27 can be made more smooth.

Figure 7:
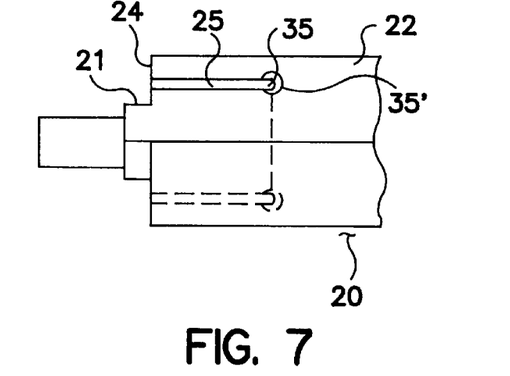
FIG. 7 is a partial longitudinal sectional view of one end portion of a printing cylinder of a fourth preferred embodiment according to the present invention.

FIG. 7 is a partial sectional view of one end portion of a printing cylinder 20 of a fourth preferred embodiment according to the present invention. In this preferred embodiment, the shape of a deepest portion, or the groove bottom portion, of the ring groove 25 dug in the axial direction of the printing cylinder 20, is formed as a toric surface 35 so as to eliminate an edge (sharp angle) portion.

With the deepest portion of the ring groove 25 being made the toric surface 35, as in this preferred embodiment, the stress concentration on the groove bottom portion caused by the deflection deformation of the printing cylinder 20 can be mitigated, and generation of cracks or fractures of the cylinder body 22 starting from the groove bottom portion, accompanied by metal fatigue, etc., can be eliminated. Thus a long period of printing accuracy (enhanced durability) can be realized.

Incidentally, in working the deepest portion, a larger toric surface 35' than the groove width of the ring groove 25 may be made within the cylinder body 22. Thereby stress concentration on the groove bottom portion is further mitigated, and the enhancement of the durability of the printing cylinder 20 can be more securely realized.

Figure 8:
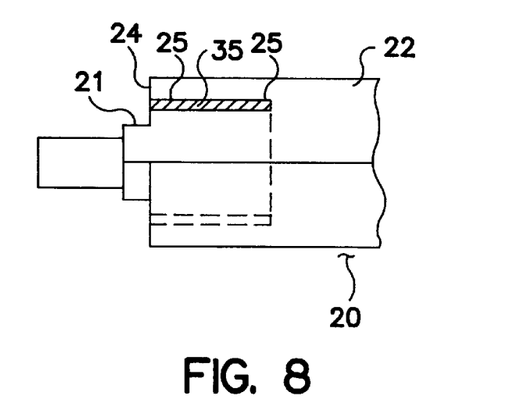
FIG. 8 is a partial longitudinal sectional view of one end portion of a printing cylinder of a fifth preferred embodiment according to the present invention.

FIG. 8 is a partial sectional view of one end portion of a printing cylinder 20 of a fifth preferred embodiment according to the present invention. In this preferred embodiment, an elastic material 36 like rubber etc. is filled in the gap (space) within the ring groove 25 dug in the axial direction of the cylinder body 22 of the printing cylinder 20.

By the elastic material 36 being filled in the gap of the ring groove 25 within the cylinder body 22, rapid changes of deflection deformation of the printing cylinder 20 can be mitigated. Especially, shocks (vibration) which may occur in the radial direction of the printing cylinder 20 can be effectively reduced, and thereby the durability of the printing cylinder 20 can be enhanced, like the fourth preferred embodiment.

Furthermore, if this preferred embodiment is employed in the blanket cylinder 26 having the air blowing hole 29 in the radial direction of the second and the third preferred embodiments as shown in FIGS. 5 and 6, then, without using the O-rings 30, 33, 34, the O-ring holder 31 and the flange 32 which were required for the preferred embodiments, the opening of the ring groove 25 on the end face 24 of the cylinder body is sealed and flow-out of compressed air at the time of attachment or detachment of the cylindrical blanket 27 can be prevented.

In the above, various preferred embodiments of the printing cylinder 20 according to the present invention were described, but one part, or an appropriate combination of plural parts, of the construction of the printing cylinders of the preferred embodiments, other than the printing cylinders of the second and the third preferred embodiments shown in FIGS. 5 and 6, may be employed for an inking roller group, a plate cylinder, a blanket cylinder, etc. corresponding to the type of application.

Further, the present invention is not limited to the preferred embodiments as described, but can have various changes and modifications without departing from the scope and spirit of the invention.

Next, description is made below as to a process of providing the ring groove 25 in the cylinder body 22 of the printing cylinder 20.

Figure 9A:
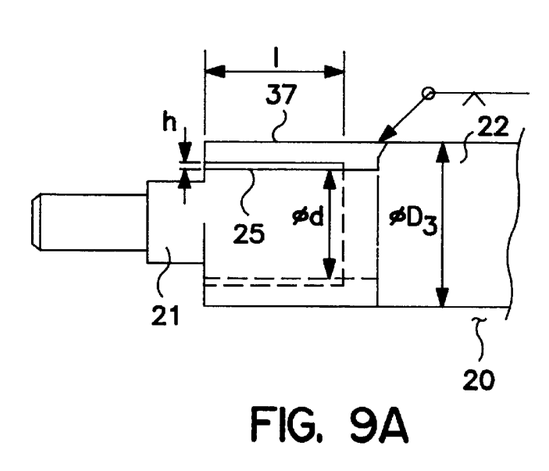

FIG. 9(a) shows a first example of the process, wherein each end portion of the cylinder body 22 of the printing cylinder 20 is worked with a smaller cylinder diameter $\phi d$ than that $\phi D_3$ of the cylinder body 22 and a sleeve 37 having a stepped portion, corresponding to a predetermined groove width h and groove depth x, on its inner side is fitted in around the outer circumference of the smaller diameter portion of the cylinder body. Then the joint portion of the end of the sleeve 37 and the portion of the diameter $\phi D_3$ of the cylinder body 22 is welded along the entire circumference. Thereafter, in order to modify welding distortion etc., the outer circumferences of the sleeve 37 and the cylinder body 22 on a shaft 21 as a rotational reference axis are processed by cutting or peeling (grinding) so that a jointless and truly circularized printing cylinder 20 is formed.

Figure 9B:
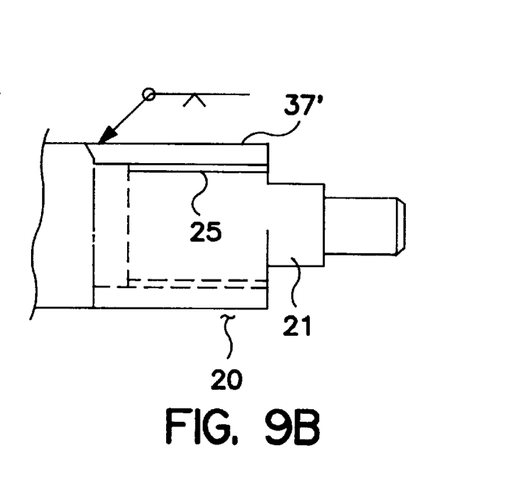

Incidentally, as shown in FIG. 9(b), which is a view of a second example of the process, a portion, corresponding to the ring groove 25, of a predetermined groove width h and groove length l is dug at the smaller diameter portion of the cylinder body 22 and a sleeve 37' having no stepped portion on its inner side may be fitted in therearound so that a printing cylinder 20 is formed likewise as in the first example.

Figure 10A:
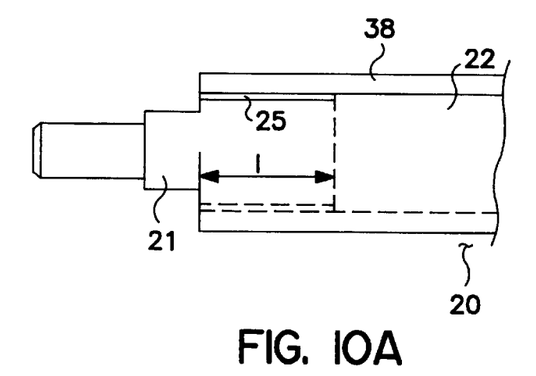

FIG. 10(a) shows a third example of the process, wherein a smaller diameter shaft is worked so as to form a stepped portion, corresponding to a predetermined groove width h and groove length l, at each end portion of the cylinder body 22. A straight sleeve (cylinder) 38, having no stepped portion on its inner side, of the same length as the cylinder body 22 is force-fitted thereto so that a printing cylinder 20 is formed. That is, by way of integration by shrinkage fitting, a truly circularized printing cylinder 20 having no jointed portion on the outer circumferential surface of the cylinder body 22 can be formed.

Figure 10B:
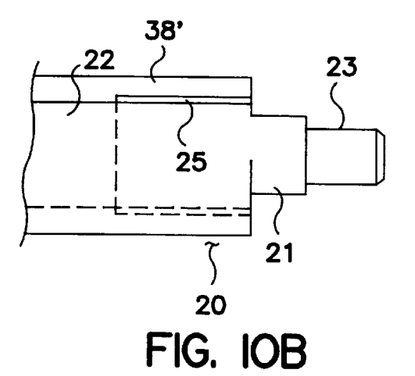

Incidentally, as shown in FIG. 10(b) which is a view of a fourth example of the process, there is provided a smaller diameter shaft of the same diameter as the inner diameter of the ring groove 25. A sleeve 38' having a stepped portion corresponding to a predetermined groove width and groove depth l on its inner side at its each end portion is integrated therewith by shrinkage fitting so that a truly circularized printing cylinder 20 is formed.

Figure 11:
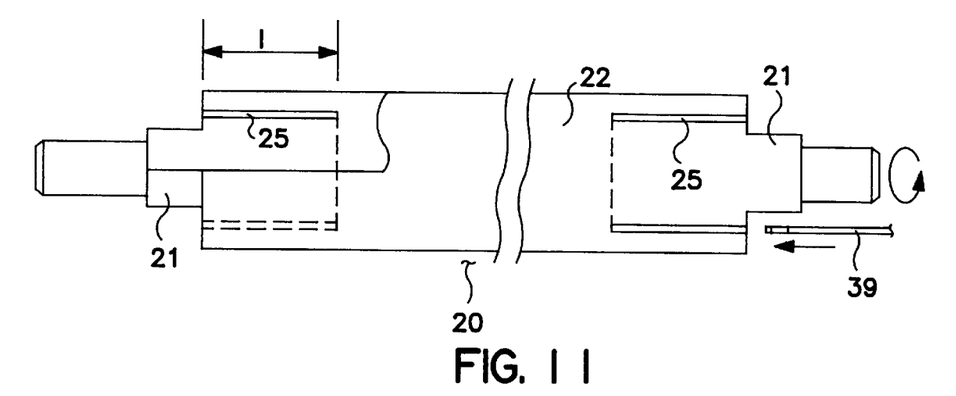
FIG. 11 is a partial longitudinal sectional view of one end portion of a fifth example, showing a manufacturing process of the printing cylinder of FIG. 1.

Further, FIG. 11 shows a fifth example of the process, wherein the ring groove 25 is formed by cutting by using a lathe using a bit 39.

What is claimed is:

1. A printing cylinder, comprising:

a cylinder body having an axis, an axial length, an outer cylindrical surface, and opposite end faces;

shafts extending axially from said opposite end faces;

an annular groove in each of said opposite end faces concentric with and radially outward of said shafts, each said annular groove extending axially into said cylinder body from its respective said opposite end face to a position that is from ¼ to ⅓ of the axial length of said cylinder body, and each said annular groove having a width in the radial direction that is 5 to 10% of the outer diameter of said cylinder body; and a groove bottom portion for mitigating stress concentration that is formed as a toric surface at an axially inner end of each said annular groove, wherein said toric surface has a width in the radial direction that is larger than the width of said annular groove.

2. A printing machine comprising:

a plate cylinder having a printing plate on an outer circumferential surface thereof, said printing plate having a printing face;

a blanket cylinder having an outer circumferential surface covered by a blanket for receiving printing ink from said printing face and printing on the surface of a running web by rolling contact;

wherein at least one of said plate cylinder and said blanket cylinder comprises:

a cylinder body having an axis, an axial length, an outer cylindrical surface, and opposite end faces;

shafts extending axially from said opposite end faces;

an annular groove in each of said opposite end faces concentric with and radially outward of said shafts, each said annular groove extending axially into said cylinder body from its respective said opposite end face to a position that is from ¼ to ⅓ of the axial length of said cylinder body, and each said annular groove having a width in the radial direction that is 5 to 10% of the outer diameter of said cylinder body; and a groove bottom portion for mitigating stress concentration that is formed as a toric surface at an axially inner end of each said annular groove, wherein said toric surface has a width in the radial direction that is larger than the width of said annular groove.

* * * * *